(12) United States Patent
Espiard et al.

(10) Patent No.: US 6,245,848 B1
(45) Date of Patent: Jun. 12, 2001

(54) BIPOPULATED LATEX BASED ON VINYL CHLORIDE POLYMERS HAVING A HIGH POPULATION LEVEL OF FINE PARTICLES, PROCESSES FOR THE MANUFACTURE THEREOF AND APPLICATIONS THEREOF

(75) Inventors: Philippe Espiard, Liancourt; Richard Peres, Saint Auban Sur Durance; Benoit Ernst, Beaumont-le-Rocher, all of (FR)

(73) Assignee: Elf Atochem S.A. (FR)

( * ) Notice: Subject to any disclaimer, the term of this patent is extended or adjusted under 35 U.S.C. 154(b) by 0 days.

(21) Appl. No.: 08/917,896

(22) Filed: Aug. 27, 1997

(51) Int. Cl.$^7$ .................................................... C08J 3/32
(52) U.S. Cl. ........................................ 524/419; 524/834
(58) Field of Search ...................... 524/834, 419

(56) References Cited

U.S. PATENT DOCUMENTS

| | | | |
|---|---|---|---|
| 4,245,070 | * 1/1981 | Kemp | 526/75 |
| 4,461,869 | * 7/1984 | Yang | 525/80 |
| 5,151,476 | 9/1992 | Marshall et al. | 526/93 |
| 5,300,551 | * 4/1994 | Candries et al. | 524/458 |

FOREIGN PATENT DOCUMENTS

| | | |
|---|---|---|
| 0 025 561 | 3/1981 | (EP) . |
| 0 270 436 | 6/1988 | (EP) . |
| 1318956 | 5/1963 | (FR) . |
| 2 286 152 | 4/1976 | (FR) . |
| 2 309 569 | 11/1976 | (FR) . |
| 2 344 579 | 10/1977 | (FR) . |

* cited by examiner

Primary Examiner—Peter D. Mulcahy
(74) Attorney, Agent, or Firm—Millen, White, Zelano & Branigan, P.C.

(57) ABSTRACT

The present invention relates to a latex containing two populations of particles of polymers based on vinyl chloride, respectively exhibiting mean diameters of between 0.9 and 1.3 $\mu$m and between 0.15 and 0.3 $\mu$m, in proportions such that the ratio by weight of the population with the lesser mean diameter to that with the greater mean diameter is between 0.4 and 0.7. Other subjects of the present invention are processes for the manufacture of the said latex and its application in fluid plastisols and foams of very good cellular quality.

9 Claims, No Drawings

BIPOPULATED LATEX BASED ON VINYL CHLORIDE POLYMERS HAVING A HIGH POPULATION LEVEL OF FINE PARTICLES, PROCESSES FOR THE MANUFACTURE THEREOF AND APPLICATIONS THEREOF

The present invention relates to a latex containing two populations of particles of polymers based on vinyl chloride. Other subjects of the present invention are processes for producing this latex and its applications.

Bipopulated latices of particles of polymers based on vinyl chloride, respectively exhibiting mean diameters of between 0.4 and 2.5 µm and between 0.08 and 1 µm, in a ratio of the diameters of between 1 and 20 and a ratio by weight of between 0.1 and 10, are known. These latices are prepared by seeded microsuspension polymerization of the corresponding monomer or monomers in the presence of a first seeding polymer, the particles of which contain at least one organosoluble initiator, of a second seeding polymer, of a surface-active agent and of a soluble metal salt, in an amount such that the molar ratio of the metal salt to the organosoluble initiator is between 0.1 and 10 (FR 2 309 569). The polymerization is carried out in the absence of supplementary addition of initiator.

Moreover, U.S. Pat. No. 5,151,476 teaches us that the metal salt/organosoluble initiator molar ratio can be reduced and that the polymerization can even be carried out in the absence of metal salt.

Bipopulated latices currently known, in particular those prepared by seeded microsuspension polymerization, lead either to fluid plastisols or to foams of good cellular quality. Until the present application, it was not possible to obtain both fluid plastisols and foams of high cellular quality from the same latex.

It has now discovered a latex containing two populations of particles of polymers based on vinyl chloride, respectively exhibiting mean diameters of between 0.9 and 1.3 µm and between 0.15 and 0.3 µm, in proportions such that the ratio by weight of the population with the lesser mean diameter to that with the greater mean diameter is between 0.4 and 0.7.

Polymers based on vinyl chloride is understood to mean homo- and copolymers, the latter containing at least 50% by weight of vinyl chloride and at least one monomer which is capable of copolymerizing with vinyl chloride. The copolymerizable monomers are those generally employed in conventional techniques for the copolymerization of vinyl chloride. Mention may be made of vinyl esters of mono- and polycarboxylic acids, such as vinyl acetate, propionate or benzoate; unsaturated mono- and polycarboxylic acids, such as acrylic, methacrylic, maleic, fumaric or itaconic acid, and their aliphatic, cycloaliphatic or aromatic esters, their amides or their nitriles; alkyl, vinyl or vinylidene halides; alkyl vinyl ethers and olefins.

The preferred polymers based on vinyl chloride are vinyl chloride homopolymers.

The latex according to the present invention can be obtained by seeded microsuspension polymerization of the corresponding monomer or monomers in the presence of a first seeding polymer (P1), the particles of which contain at least one organosoluble initiator, of a second seeding polymer (P2), the particles of which have a mean diameter less than that of the particles of the first seeding polymer (P1), of water, of an anionic emulsifier, of a soluble metal salt, in an amount such that the metal salt/organosoluble initiator molar ratio is less than 0.09, and of a reducing agent.

This process is characterized in that the reducing agent is the metabisulphite of an alkali metal and preferably potassium metabisulphite. The amount of reducing agent used is preferably between 30 and 120 ppm with respect to the monomer(s) involved.

The first seeding polymer (P1) necessary for the polymerization can be prepared according to conventional microsuspension polymerization techniques. It is used in the form of an aqueous dispersion of its particles, the mean diameter of which is preferably between 0.4 and 0.7 µm.

A means for preparing this seeding polymer consists in making use of water, vinyl chloride, alone or in combination with one or a number of copolymerizable monomer(s), an organosoluble inkiator and an anionic emulsifier, optionally in combination with a non-ionic emulsifier. The monomer or monomers are finely dispersed in water using an energetic mechanical means, such as, for example, colloid mill, fast pump, vibratory agitator or ultrasonic device. The microsuspension obtained is then heated under autogenous pressure and with moderate stirring at a temperature generally of between 30 and 65° C. After the fall in the pressure, the reaction is halted and the unconverted monomer or monomers are degassed.

The organosoluble initiators to be employed in the preparation of the first seeding polymer (P1) are represented by organic peroxides, such as lauroyl, decanoyl and caproyl peroxides, tert-butyl diethylperacetate, diethylhexyl percarbonate, diacetyl peroxide and dicetyl peroxide carbonate.

The choice of the organosoluble initiator depends on its rate of decomposition at the reaction temperature adopted. This is because the said initiator must be sufficiently reactive to make it possible to carry out the seeding polymerization within times of between 4 and 12 hours and with normal doses, of the order of 0.1 to 3% by weight with respect to the monomer or to the mixture of monomers, and its rate of decomposition must be such that the amount of initiator decomposed in the preparation of the seeding polymer does not exceed half the amount of initiator employed. For this, it is therefore necessary to choose an initiator with a half-life such that the proportion of initiator destroyed during the preparation of the seeding polymer is between 5 and 50% by weight of all the initiator employed.

Moreover, the organosoluble initiator chosen must be insoluble in water. Lauroyl peroxide is advantageously chosen.

In the case where a number of organosoluble initiators are employed, it is advantageous to choose them with different reactivities; the most reactive initiators act mainly during the preparation of the seeding polymer, whereas the least reactive initiators act in particular during the seeded polymerization.

The second seeding polymer (P2) is provided in the form of an aqueous dispersion of polymer particles, the mean diameter of which is preferably between 0.1 and 0.14 µm.

This particle dispersion can be obtained by conventional microsuspension or emulsion polymerization techniques.

When the second seeding polymer (P2) is prepared by microsuspension polymerization, the preparation is carried out as described above but the homogenization is more developed.

The second seeding polymer (P2) is preferably prepared by emulsion polymerization, which consists in making use of water, vinyl chloride, alone or in combination with one or a number of copolymerizable monomer(s), a water-soluble initiator and an anionic emulsifier, optionally in combination with a non-ionic emulsifier.

The reaction mixture is heated under autogenous pressure and moderate stirring at a temperature of between 30 and 65° C. After fall in pressure, the reaction is halted and the unconverted monomer or monomers are degassed.

The water-soluble initiators necessary for the preparation of the second seeding polymer (P2) are generally represented by hydrogen peroxide or alkali metal or ammonium persulphates, optionally in combination with water-soluble reducing agents, such as alkali metal sulphites or bisulphites. The highly variable amounts used depend on the initiator system chosen and are just sufficient to provide for the polymerization within reasonable times.

In the process according to the present invention, the rate of polymerization is accelerated by the action of the water-soluble metal salt and of the reducing agent on the organosoluble initiator. The metal salt is employed in an amount such that the metal salt/initiator molar ratio is preferably between 0.001 and 0.1 and more particularly between 0.001 and 0.03. The metal is generally chosen from iron, copper, cobalt, nickel, zinc, tin, titanium, vanadium, manganese, chromium and silver. Copper is advantageously chosen.

The presence of the anionic emulsifier, optionally in combination with at least one non-ionic emulsifier, improves the stability of the microsuspension. The emulsifier or emulsifiers can be added to the reaction mixture before and/or after and/or during polymerization. The anionic emulsifiers are preferably chosen from alkaline alkyl phosphates, alkyl sulphosuccinates, allylsulphonates, vinylsulphonates, alkylarylsulphonates, alkylsulphonates, ethoxylated alkyl sulphates, alkyl sulphates or fatty acid soaps. The preferred non-ionic emulsifiers are polycondensates of ethylene or propylene oxide with various hydroxylated organic compounds.

The amounts of emulsifier can represent up to 3% by weight of the monomer or monomers involved.

The amount of water necessary for the polymerization according to the invention is such that the initial concentration of seeding polymers, plus the monomer or monomers involved, is between 20 and 80% and preferably between 45 and 75% by weight with respect to the reaction mixture.

In addition, the seeded polymerization according to the present invention can be carried out in the presence of one or of several water-soluble initiator(s) chosen from hydrogen peroxide and alkali metal or ammonium persulphates. Ammonium persulphate is advantageously chosen.

The water-soluble initiator or initiators is or are preferably introduced into the reaction mixture before the beginning of the seeded polymerization. The amount of water-soluble initiator(s) used is preferably between 10 and 100 ppm with respect to the monomer(s) involved.

The seeded polymerization temperature is generally between 30 and 80° C. and the duration of polymerization is between 30 minutes and 12 hours and preferably between 1 and 8 hours.

Another method for the preparation of the latex in accordance with the present invention consists in choosing the reducing agent from alkyl hydrogen phosphates, lactones, ketones, carbazones and mono- or polycarboxylic acids, such as ascorbic acid or its derivatives, and in carrying out the preparation in the presence of at least one water-soluble initiator, preferably ammonium persulphate. Ascorbic acid is advantageously chosen as reducing agent.

According to a third preparation method, the latex of the present invention can be obtained by mixing a latex (L1) containing a single population of particles of polymers based on vinyl chloride, the mean diameter of which is between 0.9 and 1.3 $\mu$m, with a second latex (L2) also containing a single population of particles of polymers based on vinyl chloride, the mean diameter of which is between 0.15 and 0.3 $\mu$m, in proportions such that the ratio by mass of polymers of the latex (L2) to those of the latex (L1) is between 0.4 and 0.7.

The latex (L1) can be obtained by seeded microsuspension polymerization in the presence of a first seeding polymer (P1) based on vinyl chloride, the particles of which contain at least one organosoluble initiator, of water, of an anionic emulsifier, of a soluble metal salt, in an amount such that the metal salt/organosoluble initiator molar ratio is less than 0.09, and of reducing agent.

The latex (L2) can be obtained by emulsion polymerization of vinyl chloride, alone or in combination with one or more copolymerizable monomer(s), a water-soluble initiator and an anionic emulsifier, optionally in combination with a non-ionic emulsifier.

According to the first two preparation methods, the amount of two seeding polymers used is such that the ratio by mass of the second seeding polymer (P2) to (P1) is preferably between 0.7 and 1.8.

Whatever the preparation method used, the latices thus prepared are then advantageously dried by atomization and the resulting powders are particularly suitable for the preparation of fluid plastisols and also of foams of very good cellular quality. Moreover, the foams thus prepared exhibit a high level of whiteness, preferably of the order of 45 (ASTM Standard E 313/73 D25/2W).

EXPERIMENTAL PART (A) Preparation of the seedina polymer (P1)

The following are successively introduced into an 800 litre reactor stirred at 35 revolutions/min and adjusted to 15° C.:

375 kg of water 5 l of the buffer solution containing 426 g of potassium dihydrogenphosphate and 117 g of pure sodium hydroxide 11 g of benzoquinone powder 6 kg of lauroyl peroxide 320 kg of vinyl chloride 48 kg of a 10% by weight aqueous sodium dodecylbenzene sulphonate solution, the reactor being placed under vacuum just before the introduction of the vinyl chloride.

A fine dispersion of the vinyl chloride in the aqueous mixture is then produced at a temperature of less than or equal to 35° C. by stirring the said mixture for 105 minutes at 5500 revolutions/min.

The reaction mixture is then brought to the targeted polymerization temperature of 45° C. under autogenous pressure, the rate of stirring being 30 revolutions/min. During the polymerization, benzoquinone is introduced continuously with a constant throughput of 10.5 g/h.

After the fall in pressure to a value of 3.5 bars, that is to say after 8 hours, the unreacted vinyl chloride is degassed. A latex is thus obtained, the particles of which have a mean diameter of approximately 0.55 $\mu$m and contain approximately 2% by weight of lauroyl peroxide with respect to the polymer.

(B) Preparation of the seedinc polymer (P2)

The following are introduced into an 800 litre reactor equipped with a stirrer:

415 kg of water 1.25 kg of lauric acid and 0.8 kg of pure sodium hydroxide.

The mixture is then brought to a temperature of 65° C. and is maintained at this temperature for one hour. The mixture is then cooled to 55° C. and then the reactor is placed under vacuum. While maintaining the temperature of the mixture at 55° C., 400 kg of vinyl chloride and 4 litres of an aqueous solution containing 109 g of ammonium persulphate are then introduced, followed by the continuous addition, with a constant throughput of 3 l/h, of an aqueous solution containing, in 30 litres of water, 0.72 g of copper sulphate, 18 g of potassium metabisulphite and 0.54 litre of 12N aqueous ammonia. Three hours after the introduction of the persulphate, an aqueous solution containing 4.56 kg of sodium dodecylbenzene sulphonate per 40 litres of water is continuously added to the reaction mixture for 5 hours at 8 l/h. When the internal pressure is 4.5 bars, the reaction is halted by rapid cooling and an aqueous sodium dodecylbenzene sulphonate solution, containing 7.28 kg on a dry basis, is then introduced. The polymer particles obtained have a mean diameter in the region of 0.11 μm.

(C) Preparation of the latex (L2)

The following are introduced into a 28 litre reactor equipped with a stirrer:

9650 g of water 100 cm³ of an aqueous solution containing 0.975 g of ethylenediaminetetraacetic acid (EDTA)

0.191 g of iron sulphate 1.78 g of sodium formaldehydesulphoxylate 9.8 g of lauric acid and 3.25 g of pure sodium hydroxide.

The reactor is then placed under vacuum before the introduction of 7000 g of vinyl chloride. The reaction mixture is then brought to the targeted temperature of 58° C. As soon as the mixture reaches 45° C., an aqueous solution containing 3.5 g of potassium persulphate per 1 litre of water is introduced continuously. One hour after the beginning of the introduction of the latter, one litre of solution containing 56 g of [lacuna] dodecylbenzene sulphonate is added continuously at a constant throughput for 4 hours. When the internal pressure is 4 bars, the reactor is re-exposed to the air and then cooled. After polymerizing for 4 hours and 30 minutes, the concentration by weight of polymer is 41% and the degree of conversion of the vinyl chloride is 93%. The mean diameter of the polymer particles is 0.2 μm.

Comparative Example 1

The following are successively introduced, by suction, into an 800 litre reactor equipped with a stirrer and placed under vacuum beforehand:

400 kg of demineralized water 80 g of potassium dihydrogenphosphate 0.63 g of copper sulphate ($CuSO_4 \cdot 5H_2O$)

15.44 kg, on a dry basis, of the seeding polymer P1 latex 9.08 kg, on a dry basis, of the seeding polymer P2 latex.

The reactor at room temperature, with stirring and containing the aqueous mixture, is again placed under vacuum. 400 kg of vinyl chloride are then introduced and the reaction mixture is then brought to the targeted temperature of 58° C. As soon as the temperature of the mixture reaches 55° C., an aqueous ascorbic acid solution is introduced continuously, followed, after one hour, by an aqueous sodium dodecylbenzene sulphonate solution.

When the pressure of the mixture is 4 bars, i.e. after polymerizing for 6 hours, the introduction of the aqueous solutions and the heating are halted and the reactor is cooled.

The total amount of ascorbic acid and of sodium dodecylbenzene sulphonate introduced is 23 g and 3.2 kg respectively.

A latex is obtained, the polymer If concentration of which is 47%. Particle size analysis shows that the polymer is formed of two populations, the particles of which have mean diameters of 0.23 μm and 1.09 μm respectively. The fine particles represent 15.5% by weight of the polymer.

Comparative Example 2

The reaction is carried out as described in Example 1, except that the duration of polymerization is 8 hours and that the amount of ascorbic acid introduced is 29 g.

Example 3

The reaction is carried out as described in Example 1, except that an aqueous potassium metabisulphite solution is used instead of ascorbic acid.

Example 4

The reaction is carried out as described in Example 2, except that 15.6 kg, on a dry basis of the seeding polymer (P2) latex are introduced. The duration of polymerization is 11 hours and the amount of ascorbic acid introduced is 35 g.

Example 5

The reaction is carried out as described in Example 2, except that 22 kg, on a dry basis, of the seeding polymer (P2) latex are introduced. The duration of polymerization is 10 hours and the amount of ascorbic acid introduced is 32 g.

Example 6

The reaction is carried out as described in Example 2, except that 19.5 kg, on a dry basis, of the seeding polymer (P2) latex are introduced, followed by 12 g of ammonium persulphate. The duration of polymerization is 7 hours and the amount of ascorbic acid introduced is 26 g.

Example 7

The reaction is carried out as described in Example 6, except that 21.7 kg, on a dry basis, of the seeding polymer (P2) latex are introduced.

Example 8

The reaction is carried out as described in Example 7, except that 18 g of ammonium persulpipte are introduced and that the duration of polymerization is 6 hours.

Example 9

The reaction is carried out as described in Example 6, except that, instead of an aqueous ascorbic acid solution, an aqueous potassium metabisulphite solution is used.

Example 10

The reaction is carried out as described in Example 9, except that 13.7 kg, on a dry basis, of the seeding polymer (P2) latex are introduced.

The characteristics of the latex obtained from Examples 2 to 10 are reported in Table 1.

Example 11

Preparation of the latex (L1)

The following are successively introduced, by suction, into a 28 litre reactor equipped with a stirrer and placed under vacuum beforehand:

950 g of demineralized water 1.4 g of potassium dihydrogenphosphate dissolved in 20 ml of water 52.3 mg of CuSO$_4$·5H$_2$O dissolved in 20 ml of water and 245 g of the seeding polymer P1.

The reactor at room temperature, with stirring and containing the aqueous mixture, is again placed under vacuum. 7000 g of vinyl chloride are then introduced and the mixture is then heated to the targeted temperature of 58° C. As soon as the temperature of the reaction mixture reaches 53° C., one litre of an aqueous solution containing 0.7 g of ascorbic acid is introduced continuously and then, after one hour, one litre of an aqueous solution containing 56 g of [lacuna] dodecylbenzene sulphonate and 175 mg of sodium hydroxide is introduced continuously. When the pressure of the mixture reaches 4 bars, i.e. after polymerizing for 8 hours, introduction of aqueous solution is halted. The reactor is then placed under atmospheric pressure and then subjected to rapid cooling.

The concentration of the polymer in the aqueous mixture is 41% and the mean diameter of the particles is 1.21 μm. The degree of conversion of the vinyl chloride is 97%.

Preparation of the Mixture

A portion of the latex (L1) thus prepared is withdrawn and is mixed with a portion of the latex (L2) in proportions such that the ratio by mass of the polymer of the latex (L2) to that of the latex (L1) is equal to 0.43.

Comparative Example 12

A portion of the latex (L1) is mixed with a portion of the latex (L2), so as to obtain a ratio by mass of the polymer of the latex (L2) to that of the latex (L1) equal to 0.25.

Comparative Example 13

The reaction is carriedzout as described in Example 12, except that the ratio by mass of the polymer of the latex (L2) to that of the latex (L1) is equal to 1.

TABLE 1

| Example | Concentration of the polymer in the latex (%) | Mean diameter of the fine particles (μm) | Mean diameter of the large particles (μm) | % by weight of the fine particles |
|---|---|---|---|---|
| 2 | 49 | 0.21 | 1.1 | 16 |
| 3 | 50 | 0.25 | 1.06 | 27 |
| 4 | 43 | 0.18 | 1.13 | 18.5 |
| 5 | 49 | 0.18 | 1.12 | 22 |
| 6 | 50 | 0.23 | 1.05 | 31 |
| 7 | 50 | 0.23 | 1.09 | 33.5 |
| 8 | 49 | 0.23 | 1.04 | 38.0 |
| 9 | 46 | 0.22 | 1.01 | 35.0 |
| 10 | 48 | 0.24 | 1.07 | 22 |

Preparation of the Plastisol 100 parts of the powder, obtained after atomizing the latex prepared according to the preceding examples, are then mixed with 60 parts of dioctyl phthalate, 2.5 parts of an expansion agent (azodicarbonamide) and 2 parts of an activator.

The viscosity of the plastisol thus prepared is measured at 25° C. after half an hour and 24 hours using a rheometer of the Brookfield type.

Preparation of the foam

A portion of the plastisol prepared is coated onto a support and then placed in an oven for 150 minutes at 195° C.

The cellular quality of the foam thus obtained is evaluated on a scale from −4 to +4.

The value −4 corresponds to a foam having open, very large and heterogeneous cells, whereas the value +4 corresponds to a foam having fine, closed and very homogeneous cells.

The characteristics of the plastisol and of the foam are reported in Table 2.

Moreover, the index of whiteness, measured according to ASTM Standard E 313/73 D25/2W, of the foams obtained from the latices according to Examples 3 and 9 are 45.8 and 46.4 respectively, whereas that of the foam prepared from the latex of Example 1 is only 39.

TABLE 2

| Example | Viscosity ½ h (poises) | Viscosity 24 h (poises) | Cellular quality |
|---|---|---|---|
| 1 | 35 | 40 | +2 |
| 7 | 37 | 47 | +3 |
| 9 | 37 | 40 | +3 |
| 11 | 46 | 95 | +3 |
| 12 | 25 | 70 | +1 |
| 13 | 52 | 150 | +3 |

The preceding examples can be repeated with similar success by substituting the generically or specifically described reactants and/or operating conditions of this invention for those used in the preceding examples.

The entire disclosure of all applications, patents and publications, cited above and below, and of corresponding French application no. 96/10492, are hereby incorporated by refrencee.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A process for producing a latex containing two populations of particles of homo- or copolymer of vinyl chloride, respectively exhibiting mean diameters of between 0.9 and 1.3 μm and between 0.15 and 0.3 μm. in proportions such that the ratio by weight of the population with the lesser mean diameter to that with the greater mean diameter is between 0.4 and 0.7, which comprises polymerizing, under microsuspension conditions, the corresponding monomer or monomers in the presence of a first seeding polymer (P1), the particles of which contain at least one organosoluble initiator, of a second seeding polymer (P2), the particles of which have a mean diameter less than that of the particles of the first seeding polymer (P1), of water, of an anionic emulsifier, of a soluble metal salt, in an amount such that the metal salt/organosoluble initiator molar ratio is less than 0.09, and of a reducing agent, wherein the reducing agent is the metabisulphite of an alkali metal.

2. A process for producing a latex containing two populations of particles of homo- or copolymer of vinyl chloride, which comprises in polymerizing, under microsuspension conditions, the corresponding monomer or monomers in the presence of a first seeding polymer (P1), the particles of which contain at least one organosoluble initiator, of a second seeding polymer (P2), the particles of which have a mean diameter less than that of the particles of the first seeding polymer (P1), of water, of an anionic emulsifier, of a soluble metal salt, in an amount such that the metal salt/organosoluble initiator molar ratio is less than 0.09, and of a reducing agent, wherein the reaction is carried out in the presence of At least one water-soluble initiator.

3. A process according to claim 2, wherein the water-soluble initiator is ammonium persulphate.

4. A process according to claim 1, wherein the ratio by weight of the second seeding polymer to the first seeding polymer is between 0.7 and 1.8.

5. A process according to claim 2, the reducing agent is ascorbic acid or the metabisulphite of an alkali metal.

6. A process for producing a latex containing two populations of particles of homo- or copolymer of vinyl chloride, comprising mixing a latex (L1) monopopulated with particles of polymers based on vinyl chloride, the mean diameter of which is between 0.9 and 1.3 $\mu$m, with a latex (L2) monopopulated with particles of polymers based on vinyl chloride, the mean diameter of which is between 0.15 and 0.3 $\mu$m, in proportions such that the ratio by mass of the polymers of the latex (L2) to those of (L1) is between 0.4 and 0.7.

7. A plastisol comprising a latex produced according to claim 1.

8. A foam comprising a plastisol according to claim 7, characterized by high cellular quality.

9. A process for producing a latex containing two populations of particles of homo- or copolymer of vinyl chloride, respectively exhibiting mean diameters of between 0.9 and 1.3 $\mu$m and between 0.15 and 0.3 $\mu$m, in proportions such that the ratio by weight of the population with the lesser mean diameter to that with the greater mean diameter is between 0.4 and 0.7, which comprises polymerizing, under microsuspension conditions, the corresponding monomer or monomers in the presence of a first seeding polymer (P1), the particles of which contain at least one organosoluble initiator, of a second seeding polymer (P2), the particles of which have a mean diameter less than that of the particles of the first seeding polymer (P1), of water, of an anionic emulsifier, of a soluble metal salt, in an amount such that the metal salt/organosoluble initiator molar ratio is less than 0.9, and of a reducing agent, wherein the reducing agent is the metabisulphite of an alkali metal and the reaction is carried out in the presence of at least one water-soluble initiator.

* * * * *

UNITED STATES PATENT AND TRADEMARK OFFICE
CERTIFICATE OF CORRECTION

PATENT NO. : 6,245,848 B1
DATED : June 12, 2001
INVENTOR(S) : Espiard et al.

It is certified that error appears in the above-identified patent and that said Letters Patent is hereby corrected as shown below:

Column 9,
Line 2, change "At" to -- at --.

Column 10,
Line 17, change "0.9" to -- .09 --.

Signed and Sealed this

Fourth Day of June, 2002

Attest:

JAMES E. ROGAN
Attesting Officer          Director of the United States Patent and Trademark Office